(12) United States Patent
Mitsubori et al.

(10) Patent No.: US 7,823,667 B2
(45) Date of Patent: Nov. 2, 2010

(54) POWER UNIT FOR SMALL VEHICLE

(75) Inventors: Toshimasa Mitsubori, Saitama (JP);
Hitoshi Kondo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 11/979,044

(22) Filed: Oct. 30, 2007

(65) Prior Publication Data
US 2008/0128211 A1 Jun. 5, 2008

(30) Foreign Application Priority Data
Nov. 30, 2006 (JP) .............................. 2006-324987

(51) Int. Cl.
*B60K 8/00* (2006.01)
(52) U.S. Cl. .................... 180/54.1; 180/53.4
(58) Field of Classification Search ............... 180/54.1, 180/307, 306, 53.4, 53.1; 474/18, 28; 477/38, 477/45, 157, 159
See application file for complete search history.

(56) References Cited

U.S. PATENT DOCUMENTS

| | | | | |
|---|---|---|---|---|
| 3,646,836 A * | 3/1972 | Kubo et al. | ................ | 477/159 |
| 4,638,689 A * | 1/1987 | Sakai | ........................... | 477/45 |
| 4,733,582 A * | 3/1988 | Eggert et al. | .................. | 477/38 |
| 4,846,765 A * | 7/1989 | Sakai | .......................... | 474/28 |
| 4,897,050 A * | 1/1990 | Randolph | .................. | 439/585 |
| 4,997,412 A * | 3/1991 | Reed | ........................... | 475/24 |
| 5,409,421 A * | 4/1995 | Sakai et al. | .................... | 474/28 |
| 5,944,626 A * | 8/1999 | Spiess et al. | ................... | 474/28 |
| 5,951,421 A * | 9/1999 | D'Herripon | .................. | 474/28 |
| 5,971,876 A * | 10/1999 | Spiess et al. | ................... | 474/28 |
| 6,090,000 A * | 7/2000 | Senger | ......................... | 474/18 |
| 6,135,919 A * | 10/2000 | Shimakura | .................. | 477/157 |
| 6,588,207 B1 * | 7/2003 | Pouliot | ......................... | 60/487 |
| 6,682,451 B1 * | 1/2004 | Luh et al. | ..................... | 474/28 |
| 6,796,773 B1 | 9/2004 | Choi et al. | | |
| 6,980,897 B2 * | 12/2005 | Aoki et al. | .................... | 474/18 |

FOREIGN PATENT DOCUMENTS

| | | | |
|---|---|---|---|
| JP | 63-103784 A | 5/1988 | |
| JP | 2004-3425 A | 1/2004 | |

* cited by examiner

*Primary Examiner*—Hau V Phan
(74) *Attorney, Agent, or Firm*—Birch, Stewart, Kolasch & Birch, LLP

(57) ABSTRACT

In a power unit for a vehicle, which is a unit composed of an internal combustion engine with a crankshaft and of a power transmission system equipped with a continuously variable transmission and configured to transmit the torque from the crankshaft to the drive-wheel side while reducing the speed of the torque, to provide a power unit for a vehicle, equipped with two oil pumps and formed, with fewer component parts, into a compact structure. A first oil pump for ejecting lubricant oil and a second oil pump for ejecting oil for at least one of the controlling of the speed change in, and the lubricating of, the continuously variable transmission share a common pump shaft, and are arranged adjacent to each other in the axial direction.

10 Claims, 6 Drawing Sheets

POWER UNIT FOR SMALL VEHICLE

CROSS-REFERENCE TO RELATED APPLICATIONS

This nonprovisional application claims priority under 35 U.S.C. §119(a) on Patent Application No. 2006-324987, filed in Japan on Nov. 30, 2006, the entirety of which is incorporated herein by reference.

BACKGROUND OF THE INVENTION

1. Field of the Invention

The present invention relates to a power unit for a small vehicle, which is a unit including an internal combustion engine with a crankshaft, and also including a power transmission system, which is equipped with a continuously variable transmission controlled, for example, hydraulically, and which transmits the torque from the crankshaft to the drive-wheel side while reducing the speed of the torque.

2. Background of the Invention

A power transmission system disclosed in Japanese Patent Application Laid-Open Publication No. 2004-3425 is a conventionally known example of a power transmission system including an internal combustion engine and a continuously variable transmission. The configuration of this example includes an oil pump that generates hydraulic pressure when the pump operates ordinarily, and another oil pump that generates supplementary hydraulic pressure needed when the hydraulic pressure is low. The two oil pumps are positioned at places, with a space, apart from each other, and are driven independently by different drive mechanisms.

A configuration as is disclosed in Japanese Patent Application Laid-Open Publication No. 2004-3425, that is, a configuration including two oil pumps which are positioned at places, with a space, apart from each other, and which are driven independently by different drive mechanisms, has the following problems. For the purpose of driving the two pumps, it is necessary to provide each one of these two pumps with its own component parts. In addition, there has to be a limitation on making the power unit compact. Therefore, when a power unit equipped with a plurality of pumps is to be mounted on, for example, a small vehicle, such as a motorcycle, the power unit, desirably, is made up of fewer component parts, and has a compact structure.

SUMMARY OF THE INVENTION

The present invention is made under such circumstances. An object of the invention is providing a power unit for a small vehicle which is equipped with two oil pumps, and which has a compact structure made up of fewer component parts.

To accomplish the above-mentioned object, a first aspect of the present invention provides a power unit for a small vehicle, which is a unit composed of an internal combustion engine with a crankshaft, and of a power transmission system equipped with a continuously variable transmission and configured to transmit the torque from the crankshaft to the drive-wheel side while reducing the speed of the torque. The power unit is characterized by including a first oil pump for ejecting lubricant oil; and a second oil pump for ejecting oil for at least one of the control of the speed change in, and the lubrication of, the continuously variable transmission. The power unit is also characterized in that the first and the second oil pumps share a common pump shaft, and that the first and the second oil pumps are arranged adjacent to each other in the axial direction.

A second aspect of the present invention has the following characteristics, in addition to the configuration of the first aspect. The continuously variable transmission includes a drive shaft which has the axis parallel to the crankshaft and which is disposed below the crankshaft. The pump shaft, with the axis parallel to the crankshaft and the drive shaft, is disposed between the crankshaft and the drive shaft in the vertical direction. The axis of the crankshaft, the axis of the drive shaft, and the axis of the pump shaft are arranged so as to be positioned respectively at the three apexes of an imaginary triangle in a projection drawing on a plane that is orthogonal to these axes.

According to the first aspect of the invention, the common pump shaft is shared by the first oil pump for ejecting the lubricant oil, and the second oil pump for ejecting the oil for at least one of the control of the speed change in, and the lubrication of, the continuously variable transmission. Consequently, driving the first and the second oil pumps needs a smaller number of component parts. In addition, the first and the second oil pumps are arranged adjacent to each other in the axial direction. Consequently, assembling the two pumps to the power unit P needs a smaller number of man-hours. An efficient arrangement of the two pumps is accomplished so that the power unit can be made more compact.

According to the second aspect of the invention, a space-efficient arrangement of the crankshaft, the continuously variable transmission, and the two pumps is accomplished, and the power unit can be made even more compact. Besides, the mass center of the power unit can be positioned lower.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
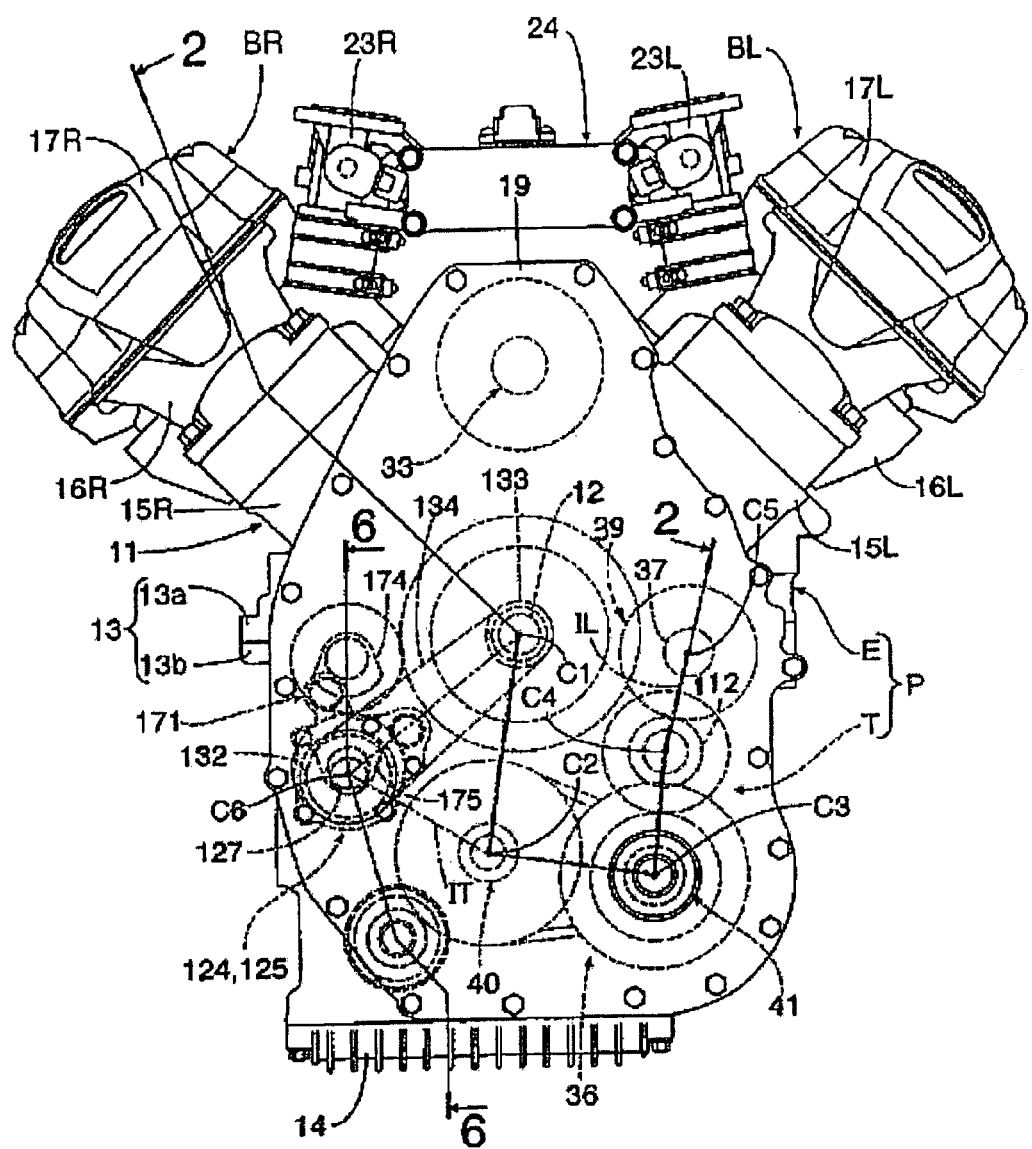
FIG. 1 is a front side view of a power unit.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
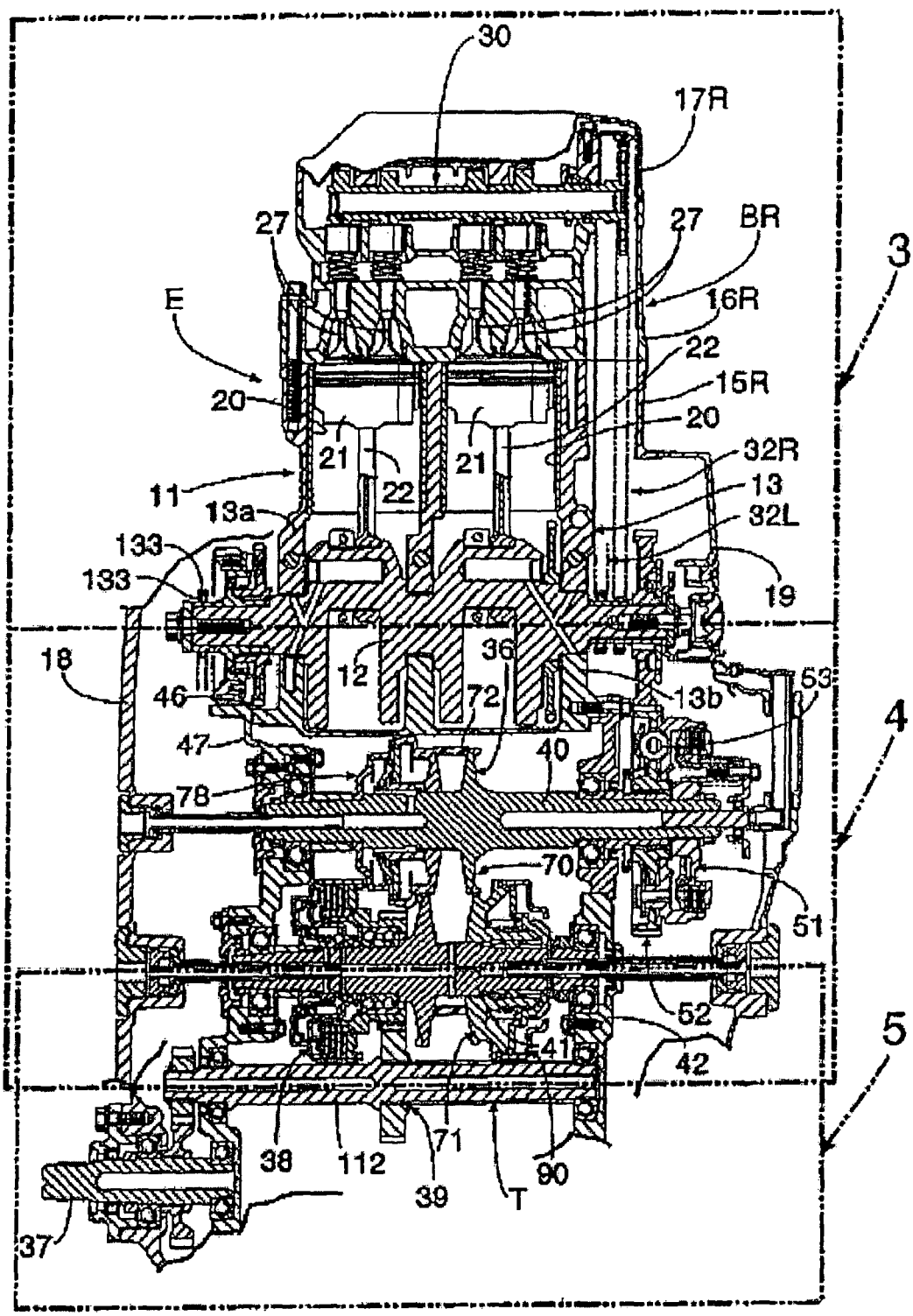
FIG. 2 is a cross-sectional view taken along the line 2-2 in FIG. 1.
Figure 3:
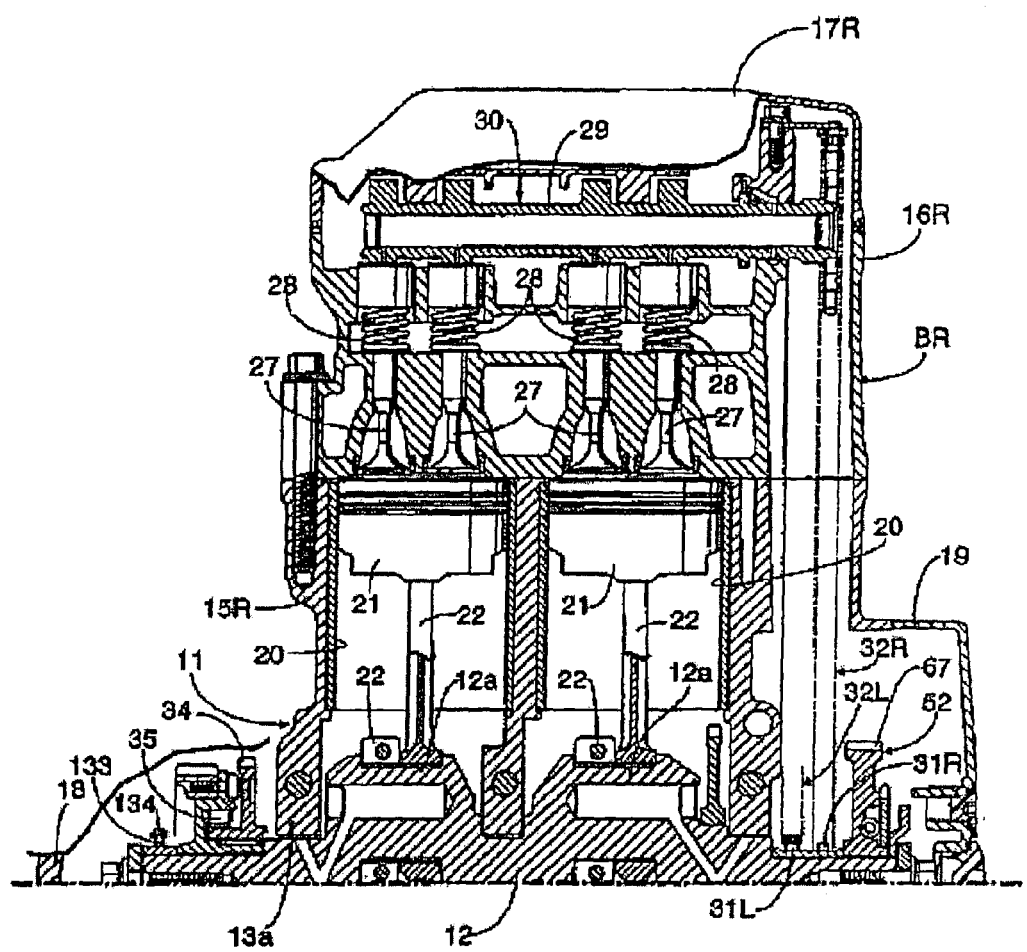
FIG. 3 is an enlarged view of a part indicated by the arrow 3 in FIG. 2.
Figure 4:
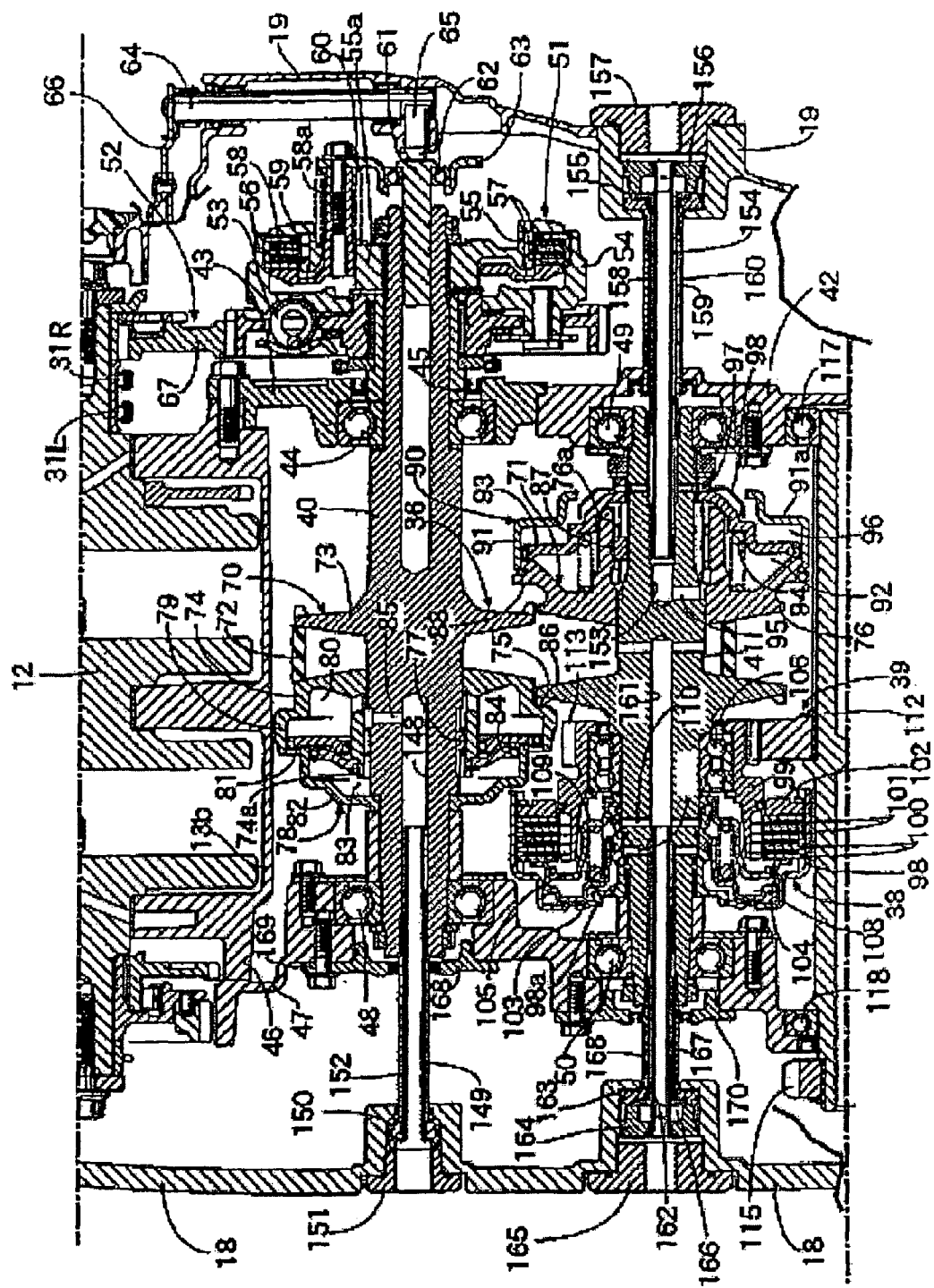
FIG. 4 is an enlarged view of a part indicated by the arrow 4 in FIG. 2.
Figure 5:
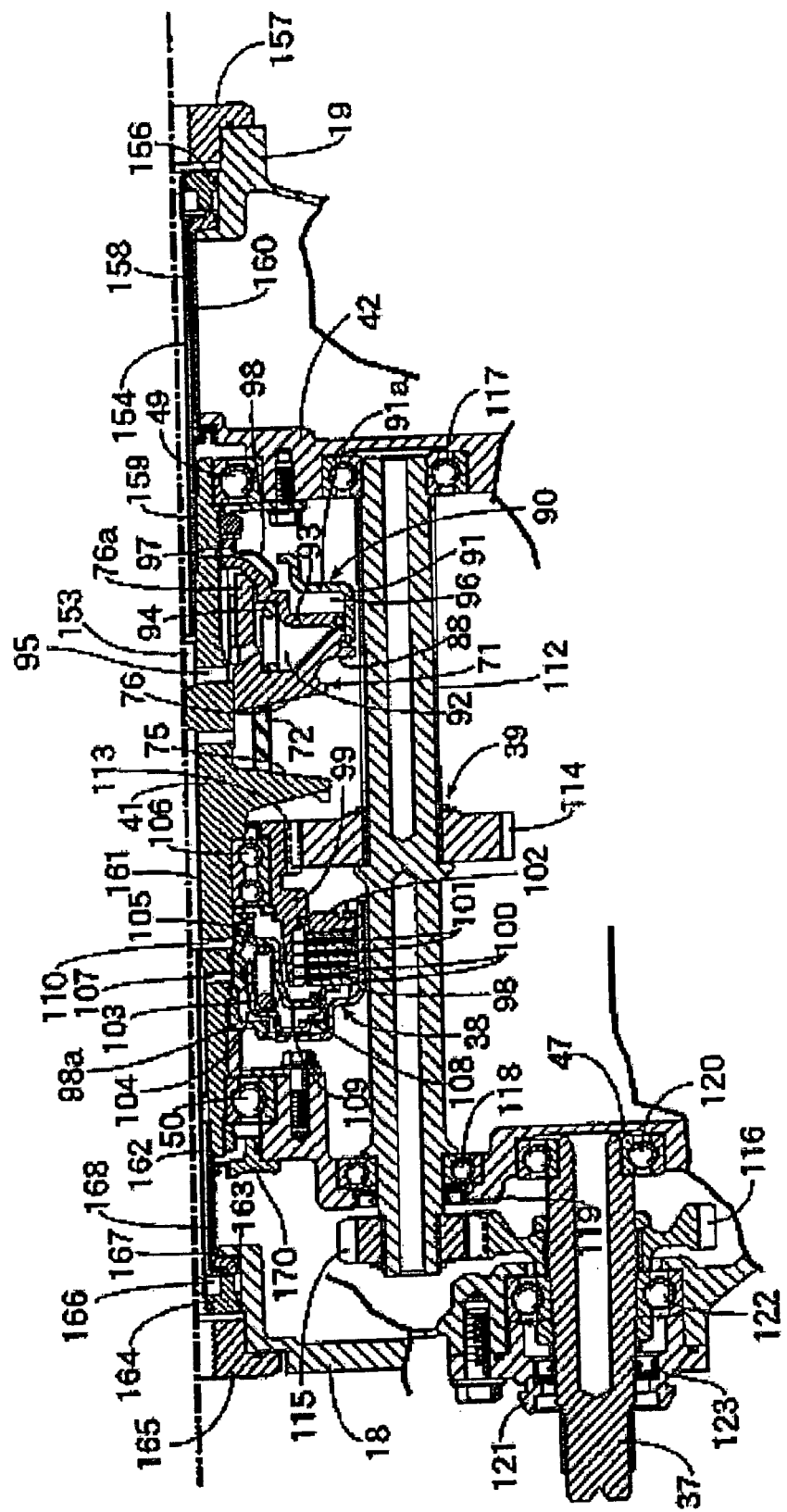
FIG. 5 is an enlarged view of a part indicated by the arrow 5 in FIG. 2.
Figure 6:
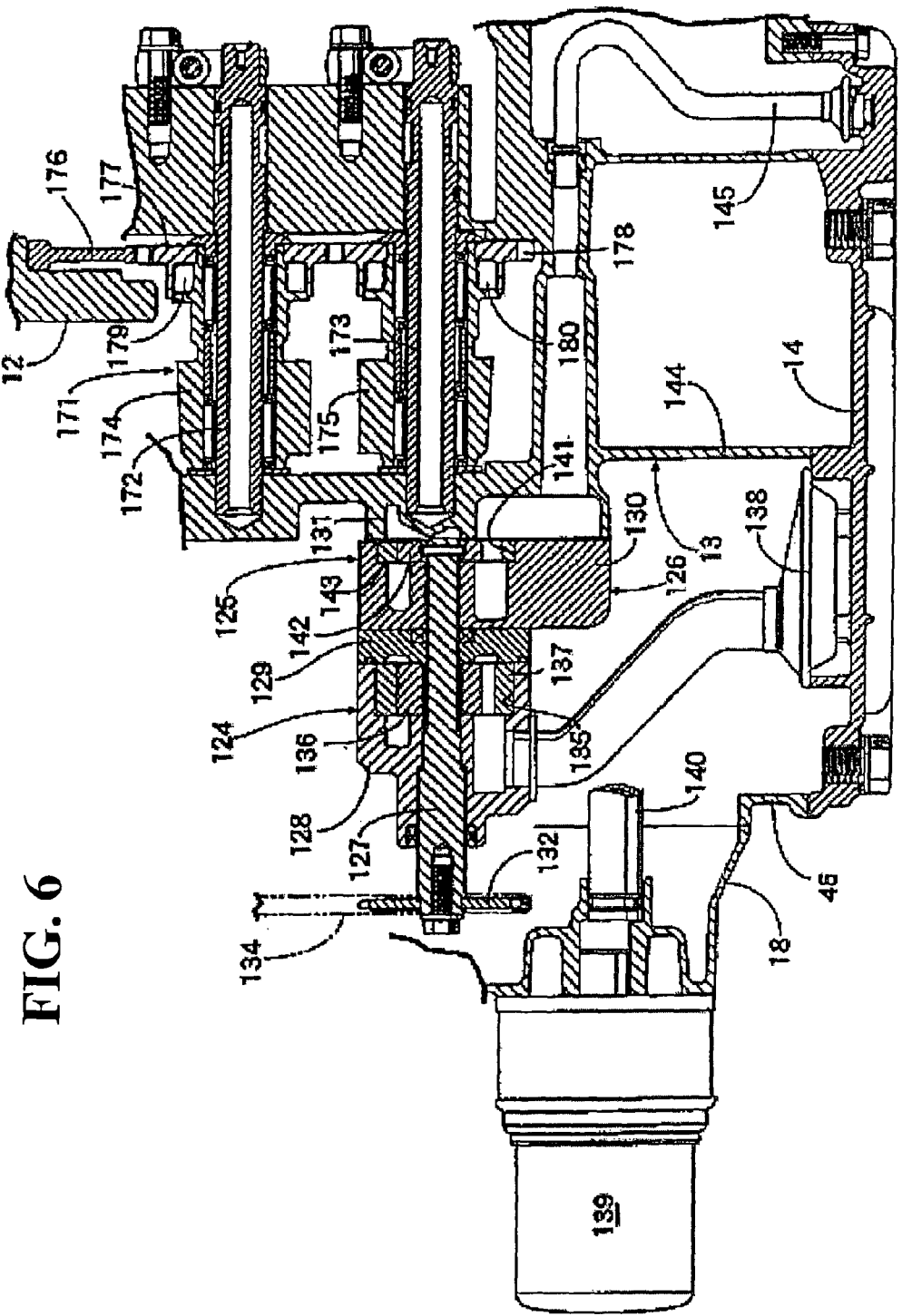
FIG. 6 is an enlarged cross-sectional view taken along the line 6-6 in FIG. 1.

FIG. 1 to FIG. 6 show an embodiment of the present invention. FIG. 1 is a front side view of a power unit. FIG. 2 is a cross-sectional view taken along the line 2-2 in FIG. 1. FIG. 3 is an enlarged view of a part indicated by the arrow 3 in FIG. 2. FIG. 4 is an enlarged view of a part indicated by the arrow 4 in FIG. 2. FIG. 5 is an enlarged view of a part indicated by the arrow 5 in FIG. 2. FIG. 6 is an enlarged cross-sectional view taken along the line 6-6 in FIG. 1.

Referring first to FIG. 1, a power unit P is mounted on a small saddle-ride type vehicle, such as a motorcycle, a motor tricycle, and an all terrain vehicle. The power unit P includes a V-type four-cylinder internal combustion engine E and a power transmission system T. The power transmission system T transmits, as reducing the speed of, the driving power generated in the internal combustion engine E to a rear wheel (not illustrated), which is a drive wheel.

Referring to FIG. 2, an engine body 11 of the internal combustion engine E includes a crankcase 13, which rotatably supports a crankshaft 12 extending in the front-to-rear direction of the vehicle. The engine body 11 also includes a right-side and a left-side banks BR, BL, which are respectively formed, into a V-shape, contiguously on the right-side and the left-side upper portions of the crankcase 13 when viewed towards the front in the traveling direction of the vehicle. The engine body 11 also includes an oil pan 14, joined to the bottom of the crankcase 13.

The crankcase 13 is formed by joining an upper case-half 13a and a lower case-half 13b to each other. The crankshaft 12 is rotatably supported between the joint surfaces respectively of the upper case-half 13a and the lower case-half 13b.

The right-side bank BR includes a right-side cylinder block 15R formed integrally with the upper case-half 13a. Also included are a right-side cylinder head 16R joined to the right-side cylinder block 15R, and a right-side head cover 17R joined to the right-side cylinder head 16R. The left-side bank BL, on the other hand, includes a left-side cylinder block 15L formed integrally with the upper case-half 13a. Also included are a left-side cylinder head 16L joined to the left-side cylinder block 15L, and a left-side head cover 17L joined to the left-side cylinder head 16L.

A rear cover 18 covers the lower portion of the engine body 11 from the rear in the traveling direction of the vehicle while a front cover 19 covers the lower portion of the engine body 11 from the front in the traveling direction. The rear cover 18 is joined to the right-side cylinder block 15R, the left-side cylinder block 15L, and a crankcase 13. Meanwhile, the upper portion of the front cover 19, which extends out to reach the lower portion between the right-side and of the left-side banks BR, BL, is joined to the right-side cylinder block 15R, the left-side cylinder block 15L, and a crankcase 13.

Referring to FIG. 3, a pair of cylinder bores 20, 20 are formed in each of the right-side and the left-side cylinder blocks 15R and 15L. The pairs of the cylinder bores 20, 20 are offset from each other in the axial direction of the crankshaft 12. Pistons 21, 21 are slidably fitted into respective cylinder bores 20, 20, and are connected, with respective connecting rods 22, 22, to respective crank pins 12a, 12a.

As FIG. 1 shows, an intake system 24 is disposed between the two banks BR, BL, and includes throttle bodies 23R and 23L. The throttle bodies 23R are joined to the right-side cylinder head 16R, and correspond individually to the cylinders of the right-side bank BR. The throttle bodies 23L are joined to the left-side cylinder head 16L, and correspond individually to the cylinders of the left-side bank BL.

Intake valves 27, 27 are disposed in the right-side and the left-side cylinder heads 16R and 16L so as to control the flow rate of the air-fuel mixture supplied from the intake system 24. A pair of the intake valves 27, 27 are disposed for each cylinder so as to be capable of being opened and closed. Valve springs 28, 28 are provided to bias the respective intake valves 27, 27 to a direction such as to close the intake valves 27, 27. Exhaust valves (not illustrated) are also disposed in the right-side and the left-side cylinder heads 16R and 16L so as to control the flow rate of the exhaust gas. A pair of the exhaust valves, which are capable of being opened and closed, are disposed for each cylinder, and are biased to a direction such as to close the valves. Intake valves 27 and exhaust valves are opened and closed by respective valve systems 30, which include intake-side cam shafts 29 and exhaust-side cam shafts (not illustrated). The intake-side cam shafts 29 correspond to the intake valves while the exhaust side cam shafts correspond to the exhaust valves.

In a state where the power unit P is mounted on the vehicle, a first end of the crankshaft 12 sticks out frontward from the crankcase 13. A synchronizing transmission means 32R, including a drive sprocket 31R fixed onto the crankshaft 12, is provided between the portion of the crankshaft 12, which portion sticks out forward from the crankcase 13, and each one of the intake-side cam shaft 29 and the exhaust-side cam shaft of each valve system 30 in the right-side bank BR. A synchronizing transmission means 32L is provided between the crankshaft 12 and each one of the intake-side cam shafts 29 and of the exhaust side cam shafts of each valve system 30 of the left-side bank BL. These synchronizing transmission means 32R, 32L respectively transmit the torque from the crankshaft 12 to the intake-side cam shafts 29 and to the exhaust-side cam shafts while the speed of the transmitted torque is reduced by half.

In a state where the power unit P is mounted on the vehicle, a second end of the crankshaft 12 sticks out rearward from the crankcase 13. A driven gear 34 is fitted onto the second end portion of the crankshaft 12 so as to rotate relative to the crankshaft 12. A starter motor 33 is attached to the upper case-half 13a of the crankcase, precisely, at a position that is covered with the front cover 19 from the front side (see FIG. 1). The driving power is transmitted from the starter motor 33 to the driven gear 34 via an unillustrated gear mechanism. A unidirectional clutch is provided between the driven gear 34 and the crankshaft 12 so as to allow the transmission of the driving power from the driven gear 34 to the side of the crankshaft 12.

Referring to FIGS. 4 and 5, the power transmission system T includes a belt-type continuously variable transmission 36, which accomplishes stepless changes in the speed of the driving power by use of hydraulic control. The power transmission system T also includes an output shaft 37, which sticks out rearward from the rear cover 18 so as to transmit the driving power to the drive wheel of the vehicle. Also included in the power transmission system T are a hydraulic clutch 38 and a gear transmission mechanism 39, which are provided between the continuously variable transmission 36 and the output shaft 37.

The continuously variable transmission 36 includes a drive shaft 40 and a driven shaft 41, which are parallel to the crankshaft 12, and which are placed below the axis of the crankshaft 12. A first end of the drive shaft 40, then, rotatably penetrates a front support-wall 43 fixed to the front side-wall 42 of the lower case-half 13b of the crankcase 13. A ball bearing 44 and an oil seal 45, which is placed at an outer position than the ball bearing 44, are set between the front support-wall 43 and the drive shaft 40. A second end of the drive shaft 40, on the other hand, is rotatably supported by a rear support-wall 47 fixed to a rear side-wall 46 of the lower case-half 13b of the crankcase 13. A ball bearing 48 is set between the rear support-wall 47 and the second end of the drive shaft 40.

A first end of the driven shaft 41 is rotatably supported by the front side-wall 42 of the lower case-half of the crankcase 13 with a ball bearing 49 set in between. A second end of the driven shaft 41 is rotatably supported by the rear support-wall 47 with a ball bearing 50 set in between.

A starter clutch 51 is put onto a shaft end of a first-end side of the drive shaft 40, which shaft end sticks out from the front support-wall 43. The starter clutch 51 includes a clutch outer 54 and a clutch inner 55. The driving power is transmitted from the crankshaft 12 via a primary reduction-gear mechanism 52 and a damper spring 53 to the clutch outer 54. The clutch inner 55 has a boss portion 55a. The boss portion 55a is placed in the center portion inside the clutch outer 54, and is coupled onto the drive shaft 40 so as not to rotate relative to the drive shaft 40. The starter clutch 51 also includes a plurality of first drive clutch plates 56 and a plurality of first driven clutch plates 57. The plurality of first drive clutch plates 56 are splined to fit into the inner circumferential wall of the clutch outer 54, and are slidable in the axial direction. The plurality of first driven clutch plates 57 are splined to fit onto the outer circumferential wall of the clutch inner 55, and are slidable in the axial direction. The first drive and the first driven clutch plates 56 and 57 are stacked alternately with each other. In addition, the starter clutch 51 includes a pressure plate 58, a pressure receiving plate 59, and a clutch spring 60. The pressure plate 58 is slidably supported by the boss portion 55a so as to face, from the inside, the first drive and the first driven clutch plates 56 and 57, which are stacked alternately with each other. The pressure receiving plate 59 is formed integrally with the clutch inner 55 so as to face, from the outside, the first drive and the first driven clutch plates 56 and 57, which are stacked alternately with each other. The clutch spring 60 biases the pressure plate 58 to the pressure-receiving-plate 59 side.

A linking shaft 58a is provided to the pressure plate 58. The linking shaft 58a extends in a direction along the axis of the drive shaft 40, and penetrates the clutch inner 55 so as to move freely. A slide shaft 61 is coaxially and slidably fitted into a first end portion of the drive shaft 40. A release member 63 is supported by the slide shaft 61 with a release bearing 62 set in between. The linking shaft 58a is fixed to the release member 63, and the clutch spring 60 is set, as being compressed, between the clutch inner 55 and the release member 63.

An operation shaft 64 is rotatably supported by the front cover 19, and switches the state of the starter clutch 51 between connected and disconnected states. The front cover also holds a push rod 65, which is slidable and determines the position of the release member 62 in accordance with the rotational movement of the operation shaft 64. An end portion of the operation shaft 64 sticks out from the front cover 19, and a clutch lever 66 is provided to the sticking-out end portion.

An operation on the clutch lever 66 pushes the push rod 65, and thus the pressure plate 58 is moved backward against the spring force of the clutch spring 60. Consequently, the first drive clutch plates 56 and the first driven clutch plates 57 are in a released state. Accordingly, the starter clutch 51 is in the clutch-off state with the clutch outer 54 and the clutch inner 55 being disconnected from each other.

To the first end side of the drive shaft 40, the torque from the crankshaft 12 is transmitted via the primary reduction-gear mechanism 52, the damper spring 53 and the starter clutch 51. The first reduction-gear mechanism 52, which transmits the torque from the crankshaft 12 to the drive-shaft 40 side while reducing the speed of the torque, includes a primary drive gear 67 provided on the crankshaft 12, a primary driven gear 68, which meshes with the primary drive gear 67. As FIG. 3 clearly shows, the primary drive gear 67 is provided on the crankshaft 12 at the outer side of the drive sprocket 31R. The primary driven gear 68 is supported by the drive shaft 40 so as to rotate relative to the drive shaft 40, and is connected to the clutch outer 54 of the starter clutch 51 with the damper spring 53 set in between.

The continuously variable transmission 36 includes a drive pulley 70 provided on the drive shaft 40, a driven pulley 71 provided on the driven shaft 41, and an endless V-belt 72, which is looped between the drive and the driven pulleys 70 and 71. The drive pulley 70 is composed of a drive-side fixed pulley-half 73, which is formed integrally with the drive shaft 40, and a drive-side movable pulley-half 74, which is opposed to the drive-side fixed pulley-half 73. The drive-side movable pulley-half 74, which is supported by the drive shaft 40, is not rotatable relative to the drive shaft 40, but is slidable in the axial direction. The driven pulley 71 is composed of a driven-side fixed pulley-half 75, which is formed integrally with the driven shaft 41, and a driven-side movable pulley-half 76, which is opposed to the driven-side fixed pulley-half 75. The driven-side movable pulley-half 76, which is supported by the driven shaft 40, is not rotatable relative to the driven shaft 41, but is slidable in the axial direction.

The V-belt 72 is looped between the drive and the driven pulleys 70 and 71. The relative positions of the drive-side and the driven-side movable pulley-halves 74, 76 respectively to the drive-side and the driven-side movable pulley-halves 73, 75 are hydraulically controlled to change the effective diameters with which the V-belt actually wraps around each of the drive and the driven pulleys 70 and 71. Accordingly, the speed of the drive power transmitted from the drive shaft 40 to the driven shaft 41 is steplessly changed.

The drive-side movable pulley-half 74 is arranged at a position opposed to the drive-side fixed pulley-half 73 from a side opposite to the side where the front support-wall 43 is located. A first boss portion 74a is formed integrally with and contiguously to the inner circumferential portion of the drive-side movable pulley-half 74, and coaxially surrounds the drive shaft 40. A key 77 is set between the first boss portion 74a and the drive shaft 40. A drive-side hydraulic drive mechanism 78 for slidingly driving the drive-side movable pulley-half 74, is disposed on the drive shaft 40 at the opposite side of the drive-side movable pulley-half 74 from the drive-side fixed pulley half 73.

The drive-side hydraulic drive mechanism 78 includes a first case member 79, a first end plate 81, a fixed cup-shaped body 82, and a second end plate 84. The cylindrical first case member 79, which surrounds coaxially the first boss portion 74a, is formed integrally with and contiguously to the outer circumferential portion of the drive-side movable pulley-half 74, and extends to the opposite side from the drive-side fixed pulley-half 73. The ring-plate-shaped first end plate 81 is slidingly in contact liquid-tightly with the inner circumference of the first case portion 79 and the outer circumference of the first boss portion 74a. Accordingly a first hydraulic chamber 80 is formed between the first end plate 81 and the drive-side movable pulley-half 74. The fixed cup-shaped body 82 is fixed on the drive shaft 40 at the opposite side of the drive-side movable pulley-half 74 from the drive-side fixed pulley-half 73. The leading end portion of the fixed cup-shaped body 82 is brought into contact with the first end plate 81. The second end plate 84 is slidingly in contact liquid-tightly with the inner circumference of the fixed cup-shaped body 82. The inner circumference portion of the second end plate 84 is fixed to the first boss portion 74a. Accordingly, a second hydraulic chamber 83 is formed between the second end plate 84 and the fixed cup-shaped body 82.

In addition, a first oil hole 85, which communicates with the first and the second hydraulic chambers 80, 83, is formed in the drive shaft 40. The drive-side movable pulley-half 74 is biased by a hydraulic force corresponding to the hydraulic pressure applied to the first and the second hydraulic chambers 80, 83. The drive-side movable pulley-half 74 is biased to a side as approaching the drive-side fixed pulley-half 73 so as to accomplish a larger effective diameter with which the V-belt 72 is wrapped around the drive pulley 70.

The driven-side fixed pulley-half 75 is formed integrally with the driven shaft 41 at a position corresponding to the drive-side movable pulley-half 74 of the drive pulley 70. When viewed from a direction parallel to the axes of the drive and the driven shafts 40 and 41, the drive-side movable pulley-half 74 and the driven-side fixed pulley-half 75 are arranged as partially overlapping each other. A run-off concave portion 86 is formed in the outer circumference of the driven-side movable pulley half 74 to prevent the drive-side movable pulley-half 74 and the driven-side fixed pulley-half 75 from interfering with each other.

The driven-side movable pulley-half 76 is arranged at a position corresponding to the drive-side fixed pulley-half 73 of the drive pulley 70. A second boss portion 76a is formed, as coaxially surrounding the driven shaft 41, integrally with and contiguously to the inner circumferential portion of the driven-side movable pulley-half 76. The second boss portion 76a extends to the side opposite from the side where the driven-side fixed pulley-half 75 is located. A key 87 is set between the second boss portion 76a and the driven shaft 41. When viewed from a direction parallel to the axes of the drive and the driven shafts 40 and 41, the drive-side fixed pulley-half 73 and the driven-side movable pulley-half 76 are arranged as partially overlapping each other. A run-off concave portion 88 is formed in the outer circumference of the driven-side movable pulley half 76 to prevent the drive-side fixed pulley-half 73 and the driven-side movable pulley-half 76 from interfering with each other.

As described above, the run-off concave portion 86 to prevent the interference between the drive-side movable pulley-half 74 and the driven-side fixed pulley-half 75 is formed in the outer circumference of the drive-side movable pulley-half 74. Meanwhile, the run-off concave portion 88 to prevent the interference between the drive-side fixed pulley-half 73 and the driven-side movable pulley-half 76 is formed in the outer circumference of the driven-side movable pulley-half 76. Consequently, the drive and the driven shafts 40 and 41 can be disposed at positions closer to each other. As a result, a compact continuously variable transmission 36 is obtained.

A driven-side hydraulic drive mechanism 90 for slidingly driving the driven-side movable pulley-half 76, is disposed on the driven shaft 41 at the opposite side of the driven-side movable pulley-half 76 from the driven-side fixed pulley half 75. The driven-side hydraulic drive mechanism 90 includes a case member 91, an end-wall member 93, and a coil spring 94. The cylindrical case member 91 coaxially surrounds the second boss portion 76a. The case member 91 has a first end fixed to the outer circumferential portion of the driven-side movable pulley-half 76, and extends to a side opposite to the side where the driven-side fixed pulley-half 75 is located. The end-wall member 93 is slidingly in contact liquid-tightly with the inner circumference of the case member 91. Accordingly, a third hydraulic chamber 92 is formed between the end-wall member 93 and the driven-side movable pulley-half 76. The inner circumferential portion of the end-wall member 93 is fixed to the driven shaft 41. The coil spring 94 is set, as being compressed, between the driven-side movable pulley-half 76 and the end-wall member 93 so as to prevent the loosening of the V-belt 72, which may possibly occur when the internal combustion engine E is stopped.

In addition, a second oil hole 95, which communicates with the third hydraulic chamber 92, is formed in the driven shaft 41. The driven-side movable pulley-half 76 is biased by a hydraulic force corresponding to the hydraulic pressure applied to the third hydraulic chamber 92. The drive-side movable pulley-half 76 is biased to a side as approaching the driven-side fixed pulley-half 75 so as to accomplish a larger effective diameter with which the V-belt 72 is wrapped around the driven pulley 71. A restriction plate member 91a is formed integrally with and contiguously to a second end of the case member 91 so as to stick out inward in the radial direction. The restriction plate member 91a, which is brought into contact with the end-wall member 93 from the opposite side of the end-wall member 93 from the driven-side fixed pulley-half 75, determines the limit to which the driven-side movable pulley-half 76 can get close to the driven-side fixed pulley-half 75.

An annular first canceller chamber 96 is formed between the end-wall member 93 and the restriction plate member 91a, and has an open inner circumference side. A first lubricant-oil passage 97 is formed in the driven shaft 41 and the end-wall member 93 so as to guide the lubricant oil. A guide member 98 is fixed to the end-wall member 93 to guide the lubricant oil from the first lubricant-oil passage 97 to the first-canceller-chamber 96 side. When a centrifugal force acts on the oil of the third hydraulic chamber 92 with its pressure being lowered due to the rotation, a force to press the driven-side movable pulley-half 76 is generated. Even with generation of such a pressing force, another centrifugal force that similarly acts on the oil in the first canceller chamber 96 prevents the driven-side movable pulley 76 from moving, undesirably, to a side so as to get closer to the driven-side fixed pulley-half 75.

The hydraulic clutch 38 is put onto the driven shaft 41 between the driven pulley 71 and the rear support-wall 47 within the continuously variable transmission 36. The hydraulic clutch 38 includes a clutch outer 98 and a clutch inner 99. The clutch outer 98 includes a cylindrical third boss portion 98a, which is joined to the driven shaft 41 so as not to rotate relative to the driven shaft 41. The clutch inner 99 is coaxially surrounded by the clutch outer 98, and is supported by the driven shaft 41 with a ball bearing 106 set in between so as to freely rotate relative to the driven shaft 41. The hydraulic clutch 38 also includes a plurality of second drive clutch plates 100 and a plurality of second driven clutch plates 101. The plurality of second drive clutch plates 100 are engaged with the clutch outer 98 so as not to rotate relative to the clutch outer 98. The plurality of second driven clutch plates 101 are engaged with the clutch inner 99, so as not to rotate relative to the clutch inner 99. The second drive and the second driven clutch plates 100, 101 are stacked alternately with each other. In addition, the hydraulic clutch 38 includes a pressure receiving plate 102, a piston 103 and a spring 105. The pressure receiving plate 102 is fixedly supported by the clutch outer 98 and faces the second drive and the second driven clutch plates 100, 101, which are stacked alternately with each other. The second drive and the second driven clutch plates 100, 101, are pressured between the pressure receiving plate 102 and the piston 103. A fourth hydraulic chamber 104 is formed between the clutch outer 98 and the piston 103. The spring 105 biases the piston 103 so as to reduce the volume of the fourth hydraulic chamber 104.

The outer circumferential portion and the inner circumferential portion of the piston 103 are slidingly in contact liquid-tightly with the clutch outer 98. In addition, a fourth oil hole 107 is formed in the driven shaft 41, and communicates to the fourth hydraulic chamber 104. An increase in hydraulic pressure in the fourth hydraulic chamber 104 causes the piston 103 to operate so as to pressure the second drive and the second driven clutch plates 100, 101 between the piston 103 and the pressure receiving plate 102. Thus, the hydraulic clutch 38 is in a connected state, in which the torque transmitted from the driven shaft 41 to the clutch outer 98 is further transmitted to the clutch inner 99.

A second canceller chamber 108 is formed, at the opposite side of the piston 103 from the fourth hydraulic chamber 104, between the second canceller chamber 108 and a wall member 109. The inner circumferential portion of the wall member 109 is fixed to the boss portion 98a of the clutch outer 98. The piston 103 is slidingly in liquid-tightly contact with the outer circumferential portion of the wall member 109. In addition, the spring 105 is housed in the second canceller chamber 108, and set between the piston 103 and the wall member 109. Moreover, a second lubricant-oil passage 110 is formed in the third boss portion 98a of the clutch outer 98 and the wall member 109 so as to guide the lubricant oil. When a centrifugal force acts on the oil of the fourth hydraulic chamber 104 with its pressure being lowered due to the rotation, a force to press the piston 103 is generated. Even with generation of such a pressing force, another centrifugal force that similarly acts on the oil in the second canceller chamber 108 prevents the piston 103 from moving, undesirably, to a side so as to press the second drive and the second driven clutch plates 100, 101 between the piston 103 and the pressure-receiving plate 102.

The gear transmission mechanism 39 includes a single idle shaft 112, which has an axis parallel to the crankshaft 12, and which is arranged between the driven shaft 41 and the output shaft 37. The gear transmission mechanism 39 also includes a first gear 113, a second gear 114, a third gear 115, and a fourth gear 116. The first gear 113 is formed integrally with the clutch inner 99 of the hydraulic clutch 38. The second gear 114 meshes with the first gear 113 and is fixed on the idle shaft 112. The third gear 115 is also fixed on the idle shaft 112. The fourth gear 116 meshes with the third gear 115, and fixed on the output shaft 37. The gear transmission mechanism 39 is provided between the driven shaft 41 and the output shaft 37 so as to make the driven shaft 41 and the output shaft 37 rotate in the same direction.

A first end portion of the idle shaft 112 is rotatably supported by the front support-wall 43 with a ball bearing 117 set in between. A second end portion of the idle shaft 112 rotatably penetrates the rear support-wall 47. A ball bearing 118 and an oil seal 119 that is placed at the outer side of the ball bearing 118 are set between the rear support-wall 47 and the idle shaft 112.

A first end of the output shaft 37 is rotatably supported by the rear support-wall 47 with a ball bearing 120. A second end of the output shaft 37 rotatably penetrates the rear cover 18 and a cap 121, which is fastened to the rear cover 18 from the outer side of the rear cover 18. A ball bearing 122 is set between the rear cover 18 and the output shaft 37. An oil seal 123 is set between the cap and the output shaft 37. The third gear 115 is arranged between the rear support-wall 47 and the rear cover 18, and is fixed on the second end portion of the idle shaft 112. The fourth gear 116 is fixed on the output shaft 37 between the rear support wall 47 and the rear cover 18.

Referring to FIG. 6, lubricant oil ejected from a first oil pump 124 is supplied to every part of the power unit P that needs to be lubricated. The oil ejected from a second oil pump 125 is used for the purpose of at least the control of the gear shifting by, and the lubrication of, the continuously variable transmission 36. In this embodiment, the oil from the second oil pump 125 is used for both purposes. The first and the second oil pumps 124 and 125 share a common pump case 126 and a pump shaft 127, and arranged adjacent to each other in the axial direction between the rear cover 18 and the crankcase 13.

The pump case 126 is composed of a first, a second, and a third case members 128, 129, and 130, which are stacked in the axial direction and are fastened to a case portion 131 formed in the crankcase 13. The pump shaft 127 rotatably penetrates the first to the third case members 128 to 130, and is rotatably supported by the pump case 126. An end portion of the pump shaft 127 sticks out from the first case member 128, and a driven sprocket 132 is fixed on the end portion. An endless chain 134 is looped between the driven sprocket 132 and a drive sprocket 133, which is fixed on the second end portion of the crankshaft 12. The torque from the crankshaft 12 is transmitted to the pump shaft 127 via the drive sprocket 133, the chain 134 and the driven sprocket 132.

The first oil pump 124 is a trochoid-type pump, and includes a first pump chamber 135 formed between the first and the second case members 128 and 129. An inner rotor 136 fixed on the pump shaft 127 and an outer rotor 137, which meshes with the inner rotor 136, are housed in the first pump chamber 135. Oil is pumped up from the oil pan 14, passes through an oil strainer 138, and then reaches to the first pump chamber 135. The oil then passes through a tubular passage member 140, and is supplied to the oil filter 139 attached to the rear cover 18. The oil from the oil filter 139 is supplied to lubricate every part of the power unit P that needs to be lubricated.

The second oil pump 125 is a trochoid-type pump, and includes a second pump chamber 141 formed between the third case member 130 and the case portion 131. An inner rotor 142 fixed on the pump shaft 127 and an outer rotor 143, which meshes with the inner rotor 142, are housed in the second pump chamber 141. In the crankcase 13, a bulkhead 144 is formed to separately pool the lubricant oil pumped up by the first oil pump 124 and the oil, which is different from the above-mentioned lubricant oil, for hydraulically controlling and lubricating the continuously variable transmission 36. The second oil pump 125 pumps up the oil for the hydraulic control and the lubrication from the oil pan 14 through the suction pipe 145.

The hydraulic pressure of the oil that the second oil pump 125 is subjected to the control performed by hydraulic pressure control valves (not illustrated), which correspond individually to the drive-side hydraulic drive mechanism 78 and the driven-side hydraulic drive mechanism 90. The oil thus controlled is supplied to the first and the second hydraulic chambers 80 and 83 in the drive-side hydraulic drive mechanism 78 and to the third hydraulic chamber 92 in the driven-side hydraulic drive mechanism 90. In addition, the oil is supplied to every part of the continuously variable transmission 36 that needs to be lubricated.

Referring to FIG. 4, the first center oil passage 148 is coaxially formed inside the second end side of the drive shaft 40. The first center oil passage 148 has a closed end on the inner side, and communicates to the first oil hole 85. A cylindrical first pipe member 149 is liquid-tightly and coaxially inserted into the first center oil passage 148 from the rear-cover 18 side. An annular first pipe support member 150, which is liquid-tightly connected to the first pipe member 149, is liquid-tightly fitted to the rear cover 18 at a position corresponding to the drive shaft 40. At the same position, a first connection member 151 is liquid-tightly screwed into the rear cover 18 so that the first pipe support member 150 can be held by and between the first connection member 151 and the rear cover 18. In addition, a tubular passage (not illustrated), which is connected to the first connection member 151, is connected to the hydraulic control valve corresponding to the drive-side hydraulic drive mechanism 78. A first tubular cover 152 surrounds coaxially the first pipe member 149 has a first end liquid-tightly penetrating a supporting member 169 fastened to the rear support-wall 47 at an outer side of the second end of the drive shaft 40. The second end of the first tubular cover 152 is liquid-tightly joined to the rear cover 18.

Referring to FIG. 4 and FIG. 5, a second center oil passage 153 is coaxially formed inside the first end side of the driven shaft 41, and has a closed end on the inner side. A second pipe member 154, which communicates to the second oil hole 95, is liquid-tightly and coaxially inserted into the second center oil passage 153. A second pipe support member 155 and a third pipe support member 156, which is liquid-tightly connected to the second pipe member 154, are liquid-tightly fitted to the front cover 19 at a position corresponding to the driven shaft 41, so that the second pipe support member 155 is held by and between the third pipe support member 156 and the front cover 19. At the same position, a second connection member 157, which communicates to the second pipe member 158 via the third pipe support member 156, is liquid-tightly screwed into the front cover 19 so that the second and the third pipe support members 155 and 156 can be held by and between the second connection member 157 and the front cover 19.

In addition, a tubular passage (not illustrated), which is connected to the second connection member 157, is connected to the hydraulic control valve corresponding to the driven-side hydraulic drive mechanism 90. A third pipe member 158 coaxially surrounds the second pipe member 154, and is liquid-tightly joined to the second pipe support member 155. The third pipe member 158 is coaxially inserted into the second center oil passage 153 so that an annular first oil passage 159 can be formed between the third and the second pipe members 158 and 154. The first oil passage 159 communicates to the first lubricant oil passage 97, but has no communication to the second oil hole 95. A second tubular cover 160 coaxially surrounds a third tubular member 158, and has its two ends joined respectively to the front side-wall 42 and the front cover 19 of the crankcase 13.

A third center oil passage 161 is coaxially formed inside the second end side of the driven shaft 41, and has a closed end on the inner side. A fourth pipe member 162, which communicates to the second lubricant-oil passage 110, is liquid-tightly and coaxially inserted into the third center oil passage 161. A fourth pipe support member 163 and a fifth pipe support member 164, which is liquid-tightly connected to the fourth pipe member 162, are liquid-tightly fitted to the rear cover 18 at a position corresponding to the driven shaft 41, so that the fourth pipe support member 163 is held by and between the fifth pipe support member 164 and the rear cover 18. At the same position, a third connection member 165, which communicates to the fourth pipe member 162 via the fifth pipe support member 164, is liquid-tightly screwed into the rear cover 18 so that the fourth and the fifth pipe support members 163 and 164 can be held by and between the third connection member 165 and the rear cover 18.

A fifth pipe member 167 coaxially surrounds the fourth pipe member 162, so that an annular oil passage 166 is formed in between. The annular oil passage 166 communicates to the fourth oil hole 107 while having no communication to the second lubricant-oil passage 110. A first end of the fifth pipe member 167 is liquid-tightly inserted into the third center oil passage 161 while a second end of the fifth pipe member 167 is liquid-tightly joined to the fourth pipe support member 163.

A third tubular cover 168 coaxially surrounds the fifth pipe member 167. A first end of the third tubular cover 168 liquid-tightly penetrates a supporting member 170, which is fastened to the rear support-wall 47 at the outer side of the second end of the driven shaft 41. A second end of the third tubular cover 168, on the other hand, is liquid-tightly joined to the rear cover 18.

Referring to FIG. 1, in the drawing, C1 is the axis of the crankshaft 12. C2 and C3 are axes respectively of the drive and the driven shafts 40 and 41 of the continuously variable transmission 36, which are arranged below the crankshaft 12. C4 is the axis of the idle shaft 112, which forms a part of the gear transmission mechanism 39. C5 is the axis of the output shaft 37. These axes C1 to C5 are arranged on an imaginary line IL, which has a substantial U-shape with its upper side being open, in the projection drawing on a plane orthogonal to these axes C1 to C5.

In addition, the drive shaft 40 of the continuously variable transmission 36 is arranged below the crankshaft 12 while the pump shaft 127 of the first and the second pumps 124 and 125 is arranged between the crankshaft 12 and the drive shaft 40 in the vertical direction. The axes C1, C2, and C6 of the crankshaft 12, of the drive shaft 40, and of the pump shaft 127 are arranged respectively at positions of apexes of an imaginary triangle IT in the projection drawing on a plane orthogonal to these axes C1, C2 and C6.

Moreover, a balancer 171 is disposed at the opposite side of the crankshaft 12 from the output shaft 37. As FIG. 6 clearly shows, the balancer 171 is a two-shaft, secondary balancer. A first and a second balancer shafts 174 and 175 of the balancer 171 are arranged with a space in the vertical direction, and are rotatably supported respectively by a pair of pivot shafts 172 and 173. The first balancer shaft 174 is fitted into a driven gear 177, which meshes with a drive gear 176 fixed on the crankshaft 12, at a fitting portion 179. The second balancer shaft 175 is fitted into a driven gear 178, which meshes with the driven gear 177, at a fitting portion 180. The drive power transmitted from the crankshaft 12 rotates the first and the second balancer shafts 174 and 175.

Some advantageous effects of this embodiment will now be described. The first oil pump 124 ejects the lubricant oil for every part of the power unit P that needs to be lubricated, while the second oil pump 125 ejects the oil for at least one of the purposes of controlling the speed change of, and lubricating of, the continuously variable transmission 36 (in this embodiment, for both purposes). In this embodiment, the first and the second oil pumps 124 and 125 share the common pump shaft 127. Consequently, driving the first and the second oil pumps 124 and 125 needs a smaller number of component parts. In addition, the first and the second oil pumps 124 and 125 are arranged adjacent to each other in the axial direction. Consequently, assembling the two pumps 124 and 125 to the power unit P needs a smaller number of man-hours. Arranging the two pumps 124 and 125 is made more efficient so that the power unit P can be made more compact.

The drive shaft 40 of the continuously variable transmission 36, with the axis parallel to the crankshaft 12, is disposed below the crankshaft 12. In addition, the pump shaft 127, with the axis parallel to both the crankshaft 12 and the drive shaft 40, is disposed between the crankshaft 12 and the drive shaft 40 in the vertical direction. Moreover, the axis C1 of the crankshaft 12, the axis C2 of the drive shaft 40, and the axis C6 of the pump shaft 127 are arranged so that each of the axes C1, C2, and C6 are positioned at each of the apexes of the imaginary triangle IT in the projection drawing on the plane that is orthogonal to the axes C1, C2, and C6. Consequently, a space-efficient arrangement of the crankshaft 12, the continuously variable transmission 36, and the two pumps 124 and 125 is accomplished, and the power unit P can be made even more compact. Besides, the mass center of the power unit P can be positioned lower.

In addition, the gear transmission mechanism 39 is disposed between the output shaft 37 and the driven shaft 41 of the continuously variable transmission 36. In the gear transmission mechanism 39, the single idle shaft 112 with the axis parallel to the crankshaft 12 is disposed between the driven shaft 41 and the output shaft 37, so that the driven shaft 41 and the output shaft 37 can rotate in the same rotational direction. Consequently, the power unit P of this embodiment can also be used even when a gear transmission replaces the belt-type continuously variable transmission 36. In so doing, no changes are necessary in the drive train and the power generating portion, that is, the internal combustion engine E.

Moreover, the idle shaft 112 is disposed between he driven shaft 41 and the output shaft 37, which is disposed in an upper portion of the continuously variable transmission 36. Consequently, a space-efficient arrangement of the gear transmission mechanism 39 is accomplished, and thus the increase in the width of the power unit P in a direction orthogonal to the axis of the crankshaft 12 can be suppressed. Thus, the power unit P can be prevented from getting bigger in size. In addition, the arrangement of the continuously variable transmission 36 below the crankshaft 12, idle shaft 112, and the output shaft 37 allows the power unit P to have a lower center of mass.

Moreover, assume that C1 is the axis of the crankshaft 12; C2 and C3, the axes respectively of the drive and the driven shafts 40 and 41 of the continuously variable transmission 36, which is disposed below the crankshaft 12; C4, the axis of the idle shaft 112, which forms a part of the gear transmission mechanism 39; and C5, the axis of the output shaft 37. These axes C1 to C5 are arranged so as to be positioned on the substantially U-shaped imaginary line IL with its upper end being open in the projection drawing on a plane orthogonal to these axes C1 to C5. Consequently, the increase in the width of the power unit P in a direction orthogonal to the axis of the crankshaft 12 can be suppressed. Thus, the power unit P can be prevented from getting bigger in size.

Furthermore, the balancer 171 is disposed at the opposite side of the crankshaft from the output shaft 37. Consequently, a space-efficient arrangement of the balancer 171 is accomplished.

An embodiment of the present invention has been described thus far, but the present invention is not limited to the embodiment described above. Various modifications in design can be made without departing from the invention defined in the scope of claims.

For example, the oil ejected from the second oil pump 125 may be used for lubricating an electronically-controlled continuously variable transmission. In addition, the continuously variable transmission may be of a type without using a belt, such as a toroidal-type continuously variable transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a small vehicle, said power unit being composed of an internal combustion engine with a crankshaft, and of a power transmission system equipped with a continuously variable transmission and configured to transmit torque from the crankshaft to the drive-wheel side while reducing the speed of the torque, the power unit comprising:
   a first oil pump for ejecting lubricant oil; and
   a second oil pump for ejecting oil for at least one of control of the speed change in the continuously variable transmission and lubrication of the continuously variable transmission,
   wherein the first and the second oil pumps share a common pump shaft, and the first and the second oil pumps are arranged adjacent to each other in the axial direction, and
   wherein the continuously variable transmission includes a drive shaft which has an axis parallel to the crankshaft and which is disposed below the crankshaft, the pump shaft with an axis parallel to the crankshaft and the drive shaft is disposed between the crankshaft and the drive shaft in the vertical direction, and the axis of the crankshaft, the axis of the drive shaft, and the axis of the pump shaft are arranged so as to be positioned respectively at the three apexes of an imaginary triangle in a projection drawing on a plane that is orthogonal to the axes of the crankshaft, the drive shaft and pump shaft.

2. The power unit for a small vehicle according to claim 1, wherein the first and second oil pumps share a common pump case, and are arranged between a rear cover and a crankcase of the engine.

3. The power unit for a small vehicle according to claim 2, wherein the pump case comprises a first, a second and a third case member that are stacked in the axial direction and are fastened to a case portion of the crankcase.

4. The power unit for a small vehicle according to claim 3, wherein an end portion of the pump shaft sticks out from the first case member, and a driven sprocket is fixed on the end portion, the power unit further comprising a drive sprocket fixed on an end of the crank shaft and an endless chain wrapped around the driven sprocket and the drive sprocket to transmit rotation of the crankshaft to the pump shaft.

5. The power unit for a small vehicle according to claim 3, wherein the first oil pump is a trochoid-type pump, and includes a first pump chamber formed between the first and second case members, and the second oil pump is a trochoid-type pump, and includes a second pump chamber formed between the third case member and the case portion of the crankcase.

6. A power unit for a vehicle, comprising:
   a first oil pump for ejecting lubricant oil to lubricate first parts of the power unit; and
   a second oil pump for ejecting lubricant oil to lubricate second parts of the power unit,
   wherein the first and the second oil pumps share a common pump shaft, and the first and the second oil pumps are arranged adjacent to each other in the axial direction, and
   wherein a continuously variable transmission of the power unit includes a drive shaft having an axis parallel to an axis of a crankshaft of the power unit, the pump shaft having an axis parallel to the crankshaft and the drive shaft, and the axis of the crankshaft, the axis of the drive shaft, and the axis of the pump shaft are arranged so as to be positioned respectively at the three apexes of an imaginary triangle in a projection drawing on a plane that is orthogonal to the axes of the crankshaft, the drive shaft and pump shaft.

7. The power unit for a vehicle according to claim 6, wherein the first and second oil pumps share a common pump case, and are arranged between a rear cover and a crankcase of the engine.

8. The power unit for a vehicle according to claim 7, wherein the pump case comprises a first, a second and a third case member that are stacked in the axial direction and are fastened to a case portion of the crankcase.

9. The power unit for a vehicle according to claim 8, wherein an end portion of the pump shaft sticks out from the first case member, and a driven sprocket is fixed on the end portion, the power unit further comprising a drive sprocket fixed on an end of the crank shaft and an endless chain wrapped around the driven sprocket and the drive sprocket to transmit rotation of the crankshaft to the pump shaft.

10. The power unit for a vehicle according to claim 8, wherein the first oil pump is a trochoid-type pump, and includes a first pump chamber formed between the first and second case members, and the second oil pump is a trochoid-type pump, and includes a second pump chamber formed between the third case member and the case portion of the crankcase.

* * * * *